United States Patent [19]
Schreiber et al.

[11] Patent Number: 5,711,508
[45] Date of Patent: Jan. 27, 1998

[54] QUICK CONNECT FLUID COUPLING EQUIPPED WITH CHECK VALVE AND SERVICE VALVE

[75] Inventors: Mitchell H. Schreiber, Rochester Hills; Joseph S. Quaranta, Oxford; Thomas E. Grooters, Rochester Hills; George Szabo, Ortonville; Richard H. Krentz, Clarkston, all of Mich.

[73] Assignee: ITT Automotive, Inc., Auburn Hills, Mich.

[21] Appl. No.: 483,671

[22] Filed: Jun. 7, 1995

[51] Int. Cl.$^6$ .................................................. F16L 37/28
[52] U.S. Cl. .................. 251/149.6; 137/872; 137/878; 137/883
[58] Field of Search .................. 251/149.6; 137/883, 137/872, 878

[56] References Cited

U.S. PATENT DOCUMENTS

| | | | |
|---|---|---|---|
| 2,327,611 | 8/1943 | Scheiwer | 285/169 |
| 4,644,973 | 2/1987 | Itoh et al. | 137/883 |
| 4,782,861 | 11/1988 | Ross | 137/883 |
| 4,819,908 | 4/1989 | Norkey | 251/149.6 |
| 5,277,402 | 1/1994 | Szabo | 251/149.6 |
| 5,277,407 | 1/1994 | Mayne et al. | 254/369 |
| 5,553,638 | 9/1996 | Home | 251/149.6 |

*Primary Examiner*—A. Michael Chambers
*Attorney, Agent, or Firm*—J. Gordon Lewis; Thomas N. Twomey

[57] ABSTRACT

A quick connect fluid coupling equipped with a check valve and a service valve includes a housing that has a primary passage and an auxiliary passage arranged in a T-shape construction. The primary passage is provided with a check valve and an outlet end adapted to receive a male connector member in a locking engagement. The outlet end is arranged at 90° with the inlet end of the primary passage. The auxiliary passage is equipped with a service valve adapted for receiving a fluid pressure detecting head at an outlet end and shares the same inlet end with the primary passage.

15 Claims, 2 Drawing Sheets

QUICK CONNECT FLUID COUPLING EQUIPPED WITH CHECK VALVE AND SERVICE VALVE

FIELD OF THE INVENTION

The present invention generally relates to a quick connect fluid coupling for joining tubular conduits and more particularly, relates to a quick connect fluid coupling for joining tubular conduits which is equipped with a check valve and a service valve for measuring fluid pressure.

BACKGROUND OF THE INVENTION

In fluid-handling conduits, it is desirable to ensure that the connectors used in-between have their female and male portions properly joined together. An improperly joined together connector coupling can cause the system to leak fluid. This is particularly troublesome when the system is a pressurized fluid system.

When a quick connector is used in fluid coupling, the female and male portions of the connectors are normally held together by friction engagement. It is important that the male portion and the female portion are properly coupled together such that the male portion is manually inserted into the female portion for establishing a fluid connection while a seal assembly seals the coupled portions together against leakage.

Various designs of quick connectors have been proposed by others. For instance, U.S. Pat. No. 2,327,611 to Schweizer provided an effectively functioning check valve. However, the valve requires complex and expensive machine parts and multiple seal elements. The valve also requires complex assembly and fabrication which is not suitable for high-volume applications. Another design, such as that shown in U.S. Pat. No. 4,819,908 to Norkey, utilizes a single seal to sealingly engage a male portion of the coupling in an engaged position and alternatively, to sealingly engage a check valve member upon removal of the male portion of the coupling. Even though this design eliminates some of the expenses of earlier designs, it is prone to leakage in the check valve mode of operation since it relies entirely on the radial compression of the seal. Another more recent design, shown in U.S. Pat. No. 5,277,402 to Szabo and assigned to the common assignee of the present invention, discloses a quick connector which includes a cylindrical body portion open at one end for receiving a male member and a through passage communicating the open end with a conduit receiving adapter at an opposite end. A valve member is located in the passage and is displaceable from a closed position to an open position to establish open communication therethrough in response to an engagement of the body portion and the male member. Even though the Szabo design provides an effective quick connect coupling by using a check valve, the design does not afford the capability of fluid pressure monitoring during the operation of a fluid coupling system. The capability of checking fluid pressure on-the-flight, i.e., during the operation of a fluid coupling system is highly desirable.

In a conventional fluid-handling conduit system, in order to monitor a fluid pressure in the conduit, a separate service valve must be provided. This requires additional lines and an additional valve to be installed and thus increases the total cost of the conduit system. It would be highly desirable to design a quick connect fluid coupling system equipped with a check valve that also provides the function of a service valve so that the fluid pressure of the system can be continuously monitored.

It is therefore an object of the present invention to provide a quick connect fluid coupling that is equipped with a check valve and a service valve.

It is another object of the present invention to provide a quick connect fluid coupling that is equipped with check valve and a service valve so that the additional expense of installing a separate service valve can be saved.

It is a further object of the present invention to provide a quick connect fluid coupling that is equipped with a check valve and a service valve such that the fluid pressure in the coupling can be continuously monitored.

It is another further object of the present invention to provide a quick connect fluid coupling equipped with a check valve and a service valve that can be manufactured in large volume inexpensively.

It is yet another object of the present invention to provide a quick connect fluid coupling equipped with a check valve and a service valve that can be molded of a plastic material.

SUMMARY OF THE INVENTION

In accordance with the present invention, a quick connect fluid coupling equipped with a check valve and a service valve in a generally T-shape one-piece plastic molded construction is provided.

In the preferred embodiment, a quick connect fluid coupling equipped with a check valve and a service valve is provided in a housing that has a primary passage and an auxiliary passage arranged in a T-shape construction. The primary passage is provided with a check valve and an outlet end adapted to receive a male connector member in a locking engagement. The outlet end is arranged at 90° with the inlet end of the primary passage. The auxiliary passage is equipped with a service valve adapted for receiving a fluid pressure detecting head at an outlet end and shares the same inlet end with the primary passage.

The auxiliary passage is constructed of a generally cylindrical elongated body which has a conduit-receiving adapter at an inlet end, an auxiliary valve or a service valve for measuring fluid pressure at an auxiliary passage outlet end and a through passage for fluid flow which connects the inlet end and the outlet end. The primary passage also has a generally cylindrical shaped body connected to the through passage of the auxiliary passage at an 90° angle.

The primary passage has a primary outlet end adapted for receiving a male member, a check valve positioned at the intersection of the auxiliary passage and the primary passage capable of axial displacement along the axis of the primary passage from a closed position where the check valve closes the passage to an open position where communication is allowed between the conduit-receiving adapter at the inlet end and the primary outlet end adapted for receiving a male connector in response to the disengagement or the engagement of a male member, respectively.

The quick connect fluid coupling is also equipped with a generally annular seal that is positioned in the primary passage juxtaposed axially to a first seat defined by the housing of the coupling and a second seat defined by the check valve. The quick connect fluid coupling further includes a service valve that is positioned at the outlet end of the auxiliary passage capable of axial displacement along the axis of the auxiliary passage from a closed position where said service valve closes the passage to an open position to allow communication between the conduit-receiving adapter at the inlet end and the outlet end of the auxiliary passage in response to the disengagement or the engagement of a pressure detecting head, respectively.

BRIEF DESCRIPTION OF THE DRAWINGS

Other objects, feature and advantages of the present invention will become apparent upon consideration of the specification and the appended drawings, in which.

DETAILED DESCRIPTION OF THE PREFERRED EMBODIMENT

The present invention provides a quick connect fluid coupling equipped with a check valve and a service valve for use in fluid-handling conduits. The check valve opens upon the locking engagement of a male connector member to allow the passage of fluid in the coupling while the service valve allows the fluid pressure in the conduit to be monitored any time during the fluid flow. The check valve mechanism employed in the present invention is similar to that described in U.S. Pat. No. 5,277,407, assigned to the common assignee of the present invention, which is incorporated hereby in its entirety by reference.

The present invention is described below in detail for the incorporation into a system of tubular conduits for conducting fluid flow and for measuring fluid pressure. However, it is contemplated that, in the broadest sense, the present invention quick connect fluid coupling can be adapted readily for other applications in view of the present specification.

Figure 1:
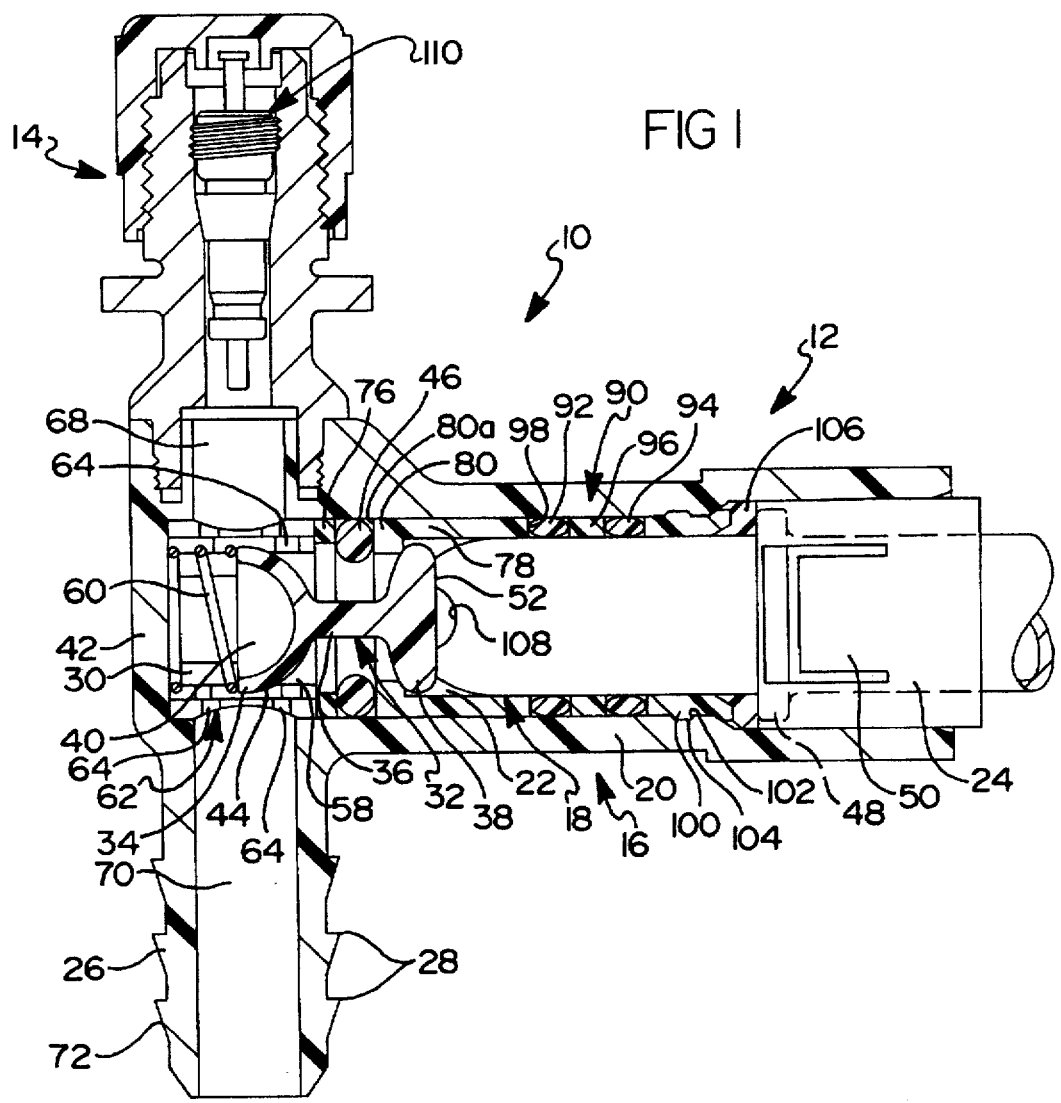
FIG. 1 is an enlarged cross-sectional view of the present invention quick connect fluid coupling.

Referring initially to FIG. 1, a quick connect fluid coupling assembly 10 which comprises a primary passage 12 and an auxiliary passage 14 is shown. A female connector member 16 is used for engaging a mating male connector member 18. The female connector member 16 includes a generally cylindrical elongated body portion 20 having a relatively constant diameter bore 22 extending therethrough concentric with the body portion axis of elongation. Bore 22 exits rightwardly from body portion 20 to define an opening 24 for receiving a male connector member 18. The body portion 20 transitions leftwardly first and then downwardly into a conduit-receiving adapter 26 which is generally of a tubular shape. The outer surface of adapter 26 has a number of circumferential barbs 28 axially spaced therealong for engaging the inner diameter of a rubber or otherwise suitable conduit (not shown).

Bore 22 has a substantially constant diameter such that, as will be described in detail below, all subcomponents are introduced into bore 22 through opening 24 and therefore permitting the use of low cost, injection molded plastic parts.

As shown in FIG. 1, a receving end of the male connector member 18 includes a check valve shown generally at 30 and disposed within bore 22. Check valve, or primary valve 30 includes a generally goblet-shaped valve member 32 including a hemi-spherical seat portion 34, an elongated stem portion 36 and a radially extending guide portion 38. Valve member 32 is disposed concentrically within bore 22, seat portion 34 having a concave recess 40 formed therein facing a passage way formed by a cylindrical wall 42 of the auxiliary passage 14. The check valve member 32 is formed of a suitable material such as an injection moldable plastic.

The outer circumferential surface of seat portion 34 defines a curved annular seat 44 which sealingly engages a fixed resilient annular seal 46 such as a rubber 0-ring within bore 22 to selectively check the flow of fluid through bore 22.

Figure 2:
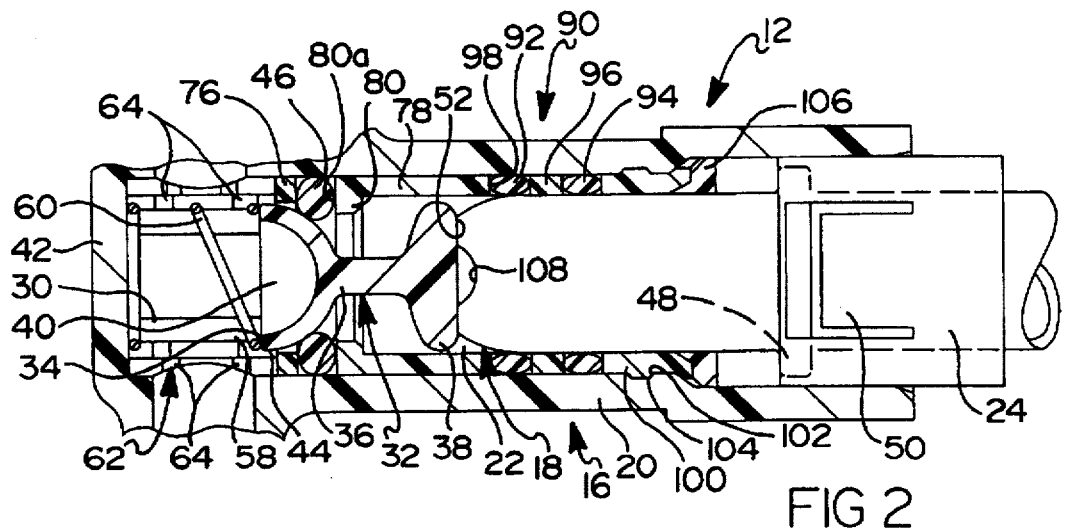
FIG. 2 is a partial enlarged cross-sectional view of the check valve of the present invention fluid coupling showing the check valve at a closed position.

Check valve member 32 is displaced from an open position illustrated in FIG. 1 wherein open communication is established through bore 22, to a closed position illustrated in FIG. 2 wherein check valve member 32 is displaced rightwardly wherein seat 44 contacts seal 46 to completely close off communication through bore 22. The position of the check valve member 32 shown in FIG. 1 indicates a response to a fully inserted male connector member 18 within opening 24 which is a receiving end of the female connector member 16 and the interlocking of a radially outwardly directed circumferential flange 48 formed on the male connector member 18 by retainer 50. Once engaged, a leading edge 52 of the male connector member 18 contacts guide portion 38 to displace the check valve member 32 to its open position.

As seen in FIG. 1, a plurality of circumferentially spaced, axially elongated, radially inwardly directed guide ribs 58, formed on the inner diameter of body portion 20 within bore 22, serves to radially guide seat portion 34 of check valve member 32 while permitting relatively free axial displacement thereof. A helical compression spring 60 disposed within bore 22 bears leftwardly against wall 42 of the auxiliary passage 14 and rightwardly against seat portion 34 to continuously bias check valve member 32 rightwardly. Sleeve bearing 62 is press fit inside the passage way of the auxiliary passage 14 containing large openings 64 through the bearing to permit open fluid communication between the through passage 68 in the auxiliary passage 14 and bore 70 of the inlet end 72 of the auxiliary passage 14.

An annular seal 46 is axially restrained from leftward displacement by a rigid spacer 76 held in place by sleeve 62 and from rightward displacement by a rigid tube bearing 78 press fit inside bore 22. Flange 80 of the tube bearing 78 has a concave circumferential groove 80a formed therein nestingly embracing an adjacent portion of seal 46 to help position the seal and to prevent it from distorting or moving radially outwardly during high pressure conditions when the check valve 32 is closed. The inner diameter of tube bearing 78 forms a loose slip fit with the outer circumferential edge of the guide portion 38 of the check valve member 32.

Also shown in FIG. 1, a seal assembly 90 comprising first and second 0-rings 92 and 94, respectively, and an intermediate spacer 96 provides a fluid tight seal between the outer circumferential surface of the male connector member 18 and the inner diameter of body portion 20 of the female connector member 16. Seal assembly 90 is axially restrained in its illustrated position between a radial end surface 98 of tube bearing 78 and a tubular retainer 100 press fit within bore 22 which includes an outwardly directed circumferential rib 102 snap fit within a mating circumferential recess 104 in the inside diameter of the body portion 20. Additionally, an annular abutment member 106 is press fit within bore 22 to provide a stop and to limit the axial inward travel of male connector member 18.

The present invention therefore ensures that neither seal 46 and 90 is displaced during insertion of the male connector member 18. It should also be noted that seal 46 has a substantially larger cross sectional area than that of 0-rings 94 and 92 to allow the use of a seal assembly 90 of substantially conventional design while permitting a large degree of axial travel of the check valve member 32 while maintaining continuous sealing engagement between seat 44 and seal 46.

When the male connector member 18 and the female connector member 16 are fully engaged as illustrated in FIG. 1, check valve member 32 is retained in the open position to provide a free and relatively unrestricted flow of fluid through an inner passage way 108 of the male connector member 18, bore 22 and passage way 70. The guide portion 38 of the check valve member 32 is preferably of a single leaf design of relatively small thickness such that the passage way 108 of the male connector member 18 is not substantially blocked.

Figure 4:
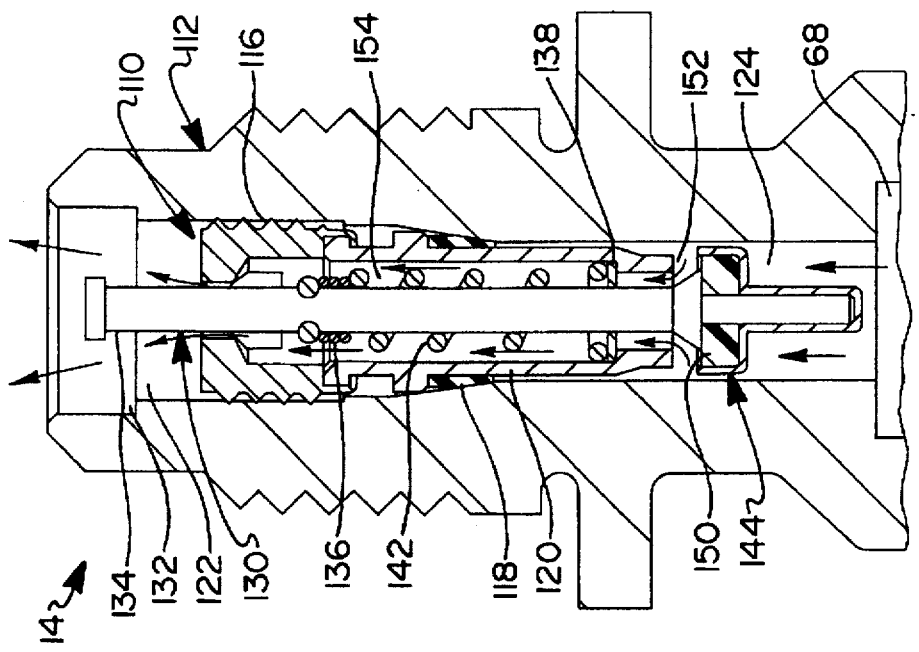
FIG. 4 is a partial enlarged cross-sectional view of the service valve in an open position.
Figure 3:
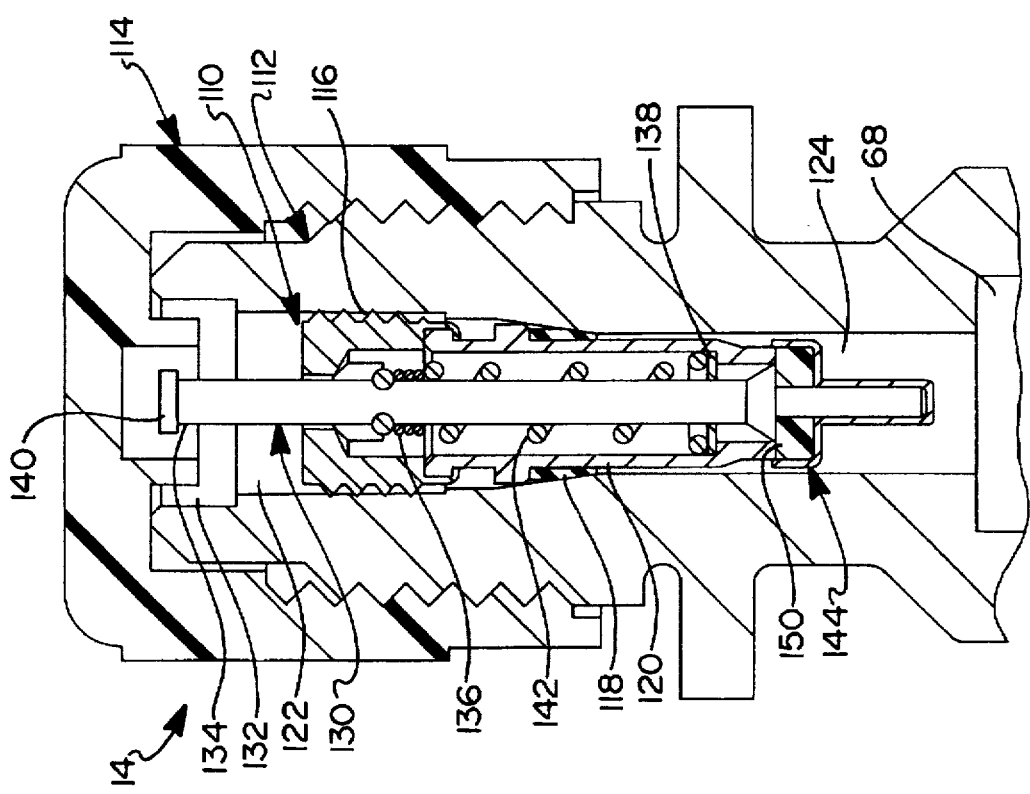
FIG. 3 is a partial enlarged cross-sectional view of the service valve in a closed position.

Another advantage made possible by the present invention is the service valve 110 mounted in the auxiliary passage 14. An enlarged cross-sectional view of the service valve (or auxiliary valve) 110 is shown in FIGS. 3 and 4. The service valve 110 is mounted in the service valve mounting block 112 molded of an injection moldable plastic material. The mounting block 112 and the valve 110 are covered and protected by a screw-on cap 114 which is also injection molded of a plastic material. As shown in FIG. 3, the service valve 110 is screwed into the mounting block 112 by a screw-thread arrangement 116. A teflon sleeve 118 is press fit on the service valve body 120 to provide a fluid-tight seal between the upper service valve chamber 122 and the lower service valve chamber 124.

The service valve 110 is similar to those conventionally available for measuring fluid pressure, i.e. commonly known as a Schrader valve. It contains a shaft 130 supported by an upper retainer 132 through aperture 134 having an inner diameter slightly larger than the diameter of the shaft 130. The shaft 130 is further supported by mounting means 136 and 138. When top 140 of shaft 130 is pushed down by a pressure reading device, helical spring 142 is compressed to allow bottom seat 144 to be pressed down and separate from valve body 120. A pliable seal member 150 is press fitted inside seat 144 to ensure a tight seal when the valve is in a closed position.

FIG. 4 is a schematic showing the service valve in an open position. It is seen that when shaft 130 of service valve 110 is pressed down, the fluid flows from the lower chamber 68 into the flow passage way 152 between the gasket 150 and the valve body 120, through the internal passage way 154 into the upper valve chamber 122 and thus permitting fluid pressure be monitored by a pressure reading device mounted on the upper retainer 132 of valve 110.

While the present invention has been described in an illustrative manner, it should be understood that the terminology used is intended to be in a nature of words of description rather than of limitation.

Furthermore, while the present invention has been described in terms of a preferred embodiment thereof, it is to be appreciated that those skilled in the art will rather apply these teachings to other possible variations of the invention.

The embodiments of the invention in which an exclusive property or privilege is claimed are defined as follows:

1. A combination quick disconnect and valve mechanism, comprising:
a housing including an auxiliary passage of a first generally cylindrically elongated body portion having a conduit-receiving adapter at an inlet end, an auxiliary valve for accessing said fluid pressure at an auxiliary passage outlet end, said housing further including
a primary passage having a second generally cylindrically elongated body portion connecting to said through passage of said auxiliary passage at a 90° angle in a T-shape arrangement having a primary outlet end wherein said primary outlet end includes a female portion of a quick connector means, wherein said female quick connector means is adapted for receiving a male portion of a quick connector
a primary valve member positioned at an intersection of said auxiliary passage and said primary passage said valve member adapted for axial displacement along the axis of said primary passage from a closed position wherein said primary valve member closes said passage to an open position wherein open communication is established between said conduit-receiving adapter at said inlet end and said primary outlet end, wherein said primary valve member is adapted to receive said male portion of said quick connector in response to a disengagement or an engagement of said male portion of said quick connector in said primary outlet end,
a generally annular seal means positioned within said primary passage axially juxtaposed to a first substantially rigid seat defined by said housing and a second substantially rigid seat defined by said primary valve member, and
an auxiliary valve member positioned at the outlet end of said auxiliary passage disposed for axial displacement along the axis of said auxiliary passage wherein said auxiliary valve member is maneuverable within said auxiliary passage from a closed position wherein said auxiliary valve member closes said passage, to an open position wherein fluid communication is established between said conduit-receiving adapter at said inlet end and said auxiliary passage outlet end in response to a disengagement or an engagement of a pressure detecting head, respectively.

2. A mechanism according to claim 1, wherein said primary valve member further comprises a guide member operative to maintain axial orientation of said primary valve member within said primary passage, said guide member being press-fit within said through passage of said primary outlet end and operative to abut said guide element and to axially displace said primary valve member to an open position upon locking engagement with said male connector member.

3. A mechanism according to claim 1 further comprising means operative to bias said primary valve member toward said closed position.

4. A mechanism according to claim 3, wherein said biasing means comprises a helical spring.

5. A mechanism according to claim 1, wherein said generally annular seal means is toroidal and said second seat is radially tapered toward said open end to effect simultaneous axial and radial compressive engagement of said seal means when said primary valve member is in a closed position.

6. A mechanism according to claim 1 further comprising axially extending guide surfaces formed within a through passage operative to maintain axial orientation of said primary valve member.

7. A mechanism according to claim 6, wherein said guide surfaces are formed of a plurality of circumferentially spaced, radially inwardly directed, axially elongated guide ribs.

8. A mechanism according to claim 1, wherein said auxiliary passage further comprises a cap disposed on top of said outlet end to protect said auxiliary passage from damage.

9. A mechanism according to claim 1 further comprising means operative to bias said auxiliary valve member toward a closed position.

10. A mechanism according to claim 9, wherein said means comprises a helical spring.

11. A mechanism according to claim 1 further comprising annular sealing means positioned between said auxiliary valve member and said through passage to seal against fluid flow thereinbetween.

12. A mechanism according to claim 11, wherein said annular sealing means is a teflon gasket.

13. A mechanism according to claim 1, wherein said valve mechanism housing is molded of a durable plastic material.

14. A mechanism according to claim 1, wherein said valve mechanism housing is molded of nylon.

15. A quick connect fluid connector equipped with a check valve and a service valve comprising:

a generally T-shaped, on-piece body comprising a primary passage having a check valve and an auxiliary passage having a service valve, Said primary passage having an outlet end including quick connector means adapted for receiving a male connector member in a releasable locking engagement and a check valve positioned at an intersection of said primary passage and said auxiliary passage disposed for axial displacement along the axis of said primary passage which is connected and situated 90° to said auxiliary passage from a closed position wherein said check valve closes said primary passage by engaging a generally annular seal means to an open position wherein communication is established between a conduit-receiving adapter in an inlet end and said primary passage outlet end, wherein said primary valve member is adapted to receive a male connector member in response to a disengagement or an engagement of the male connector member in said male connector member receiving end, respectively, and said auxiliary passage of a generally cylindrically elongated body portion sharing said conduit-receiving adapter at said inlet end of the primary passage, a service valve adapted for measuring a fluid pressure at an auxiliary passage outlet end and a through passage for said fluid flow connecting the inlet end and the outlet end, said service valve being positioned at the outlet end of said auxiliary passage and is disposed for axial displacement along the axis of said auxiliary passage and within said passage from a closed position wherein said service valve closes the passage to an open position to establish communication between said conduit-receiving adapter at the inlet end and said outlet end of the passage in response to a disengagement or an engagement of a pressure detecting head, respectively.

* * * * *

UNITED STATES PATENT AND TRADEMARK OFFICE
CERTIFICATE OF CORRECTION

PATENT NO. : 5,711,508
DATED : Jan. 27, 1998
INVENTOR(S) : Schreiber et al.

It is certified that error appears in the above-indentified patent and that said Letters Patent is hereby corrected as shown below:

In Claim 1, Col. 6, line 5, insert "," between the words "passage said".

In Claim 1, Col. 6, line 6, insert the word "primary" before "valve".

Signed and Sealed this

Twenty-first Day of April, 1998

Attest:

BRUCE LEHMAN

Attesting Officer

Commissioner of Patents and Trademarks